United States Patent [19]

Toyoshima et al.

[11] Patent Number: 4,958,406
[45] Date of Patent: Sep. 25, 1990

[54] METHOD AND APPARATUS FOR OPERATING VACUUM CLEANER

[75] Inventors: Hisanori Toyoshima; Fumio Jyoraku; Yoshitaro Ishii; Kazuo Tahara, all of Hitachi; Haruo Koharagi; Syuji Watanabe, both of Ibaraki; Kouichi Saito, Kitaibaraki; Kunio Miyashita, Hitachi; Tunehiro Endo, Hitachiota; Wakichiro Hishi, Nagareyama, all of Japan

[73] Assignee: Hitachi, Ltd., Tokyo, Japan

[21] Appl. No.: 284,382

[22] Filed: Dec. 14, 1988

[30] Foreign Application Priority Data

Dec. 15, 1987 [JP] Japan .................................. 62-316885
Mar. 7, 1988 [JP] Japan .................................. 63-51488

[51] Int. Cl.⁵ ................................................ A47L 9/28
[52] U.S. Cl. .......................................... 15/319; 15/339
[58] Field of Search ................................. 15/319, 339

[56] References Cited

U.S. PATENT DOCUMENTS 4,399,585  8/1985  Kullik et al. ........................... 15/319
4,654,924  4/1987  Getz et al. ............................. 15/319
4,817,234  4/1989  Greulich ............................... 15/339

FOREIGN PATENT DOCUMENTS 2032476  5/1972  Fed. Rep. of Germany ........ 15/319
2910832  9/1979  Fed. Rep. of Germany ........ 15/339
 203462 10/1983  German Democratic Rep. ... 15/319
2082351  3/1982  United Kingdom .................. 15/319

Primary Examiner—Chris K. Moore
Attorney, Agent, or Firm—Antonelli, Terry, Stout & Kraus

[57] ABSTRACT

In a vacuum cleaner comprising an electric blower and a speed control unit to operate the electric blower at a variable speed, a plurality of kinds of operation control rules of the electric blower are previously stored in the speed control unit, a load current value of the electric blower is continuously detected during the cleaning and the type of the surface to be cleaned is estimated from the load current value. Thereafter, the operation control rule suitable for the estimated cleaning surface is selected from the operation control rules stored in the speed control unit and the electric blower is driven on the basis of the selected operation control rule.

10 Claims, 12 Drawing Sheets

F I G. 2
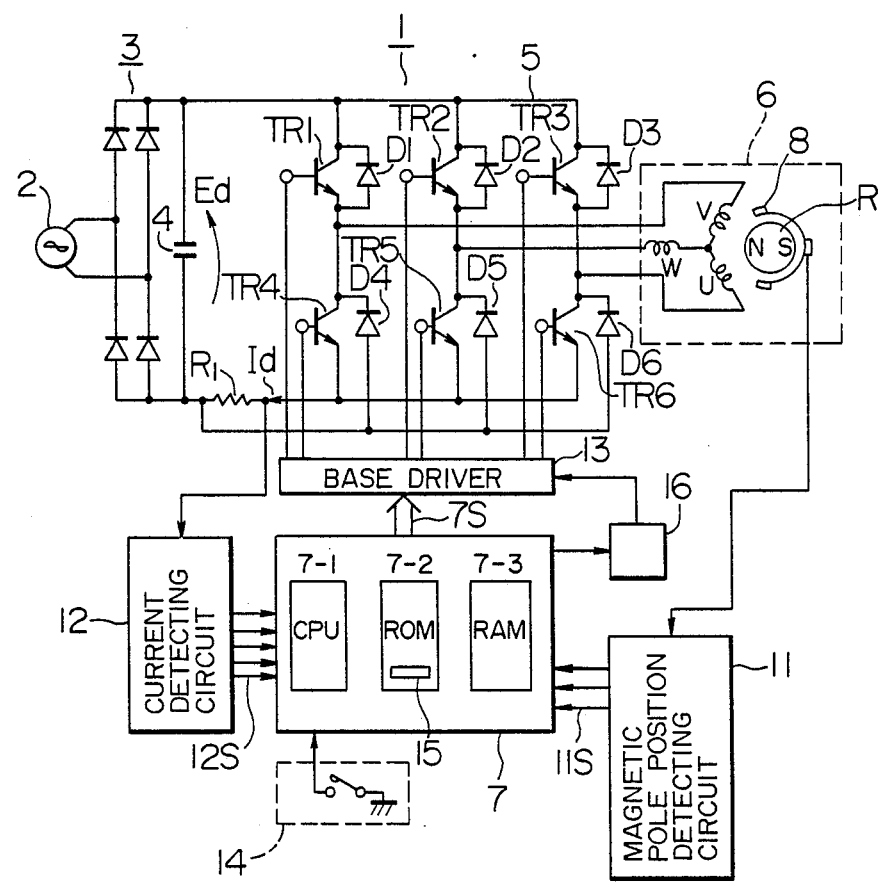

F I G. 4A
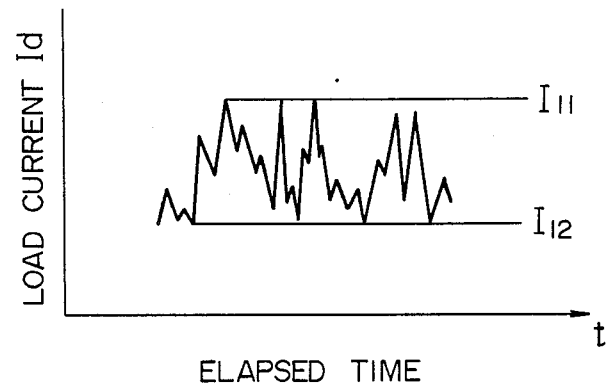
F I G. 4B
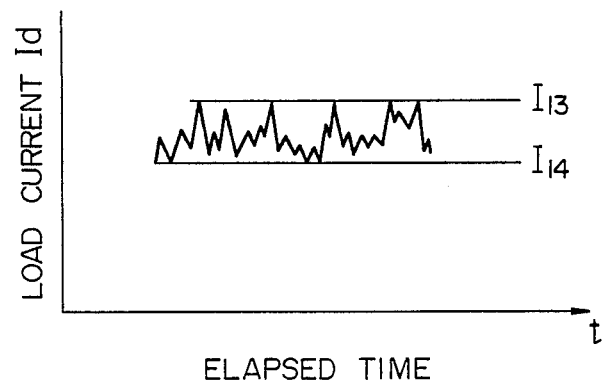

METHOD AND APPARATUS FOR OPERATING VACUUM CLEANER

BACKGROUND OF THE INVENTION

The present invention relates to a method of operating a vacuum cleaner and, more particularly, to a method and apparatus for operating a vacuum cleaner which is optimally operated in accordance with the surface to be cleaned or the clogging state of the cleaner.

In a general vacuum cleaner, the input to the vacuum is constant with respect to an air flow rate irrespective of the type of surface to be cleaned. Therefore, the optimum control or the control which is comfortable to the user cannot be performed depending on the surface to be cleaned or object to be cleaned because the suction force is constantly too strong or weak.

This problem can be solved by, for instance, contolling the input in accordance with the type of surface to be cleaned, thereby adjusting the air flow rate of the vacuum cleaner. For adjusting the air flow rate of the vacuum cleaner, means for variably setting the rotational speed of the electric blower for creating the suction is first considered. Controlling the phase by using a thyristor or an inverter are known methods of varying the rotational speed of the electric blower.

The vacuum cleaner disclosed in JP-A-59-146632 belongs to the former method, in which the operating mode can be selected in accordance with the states of various kinds of floor surfaces to be cleaned.

According to the vacuum cleaner disclosed in JP-A-56-34325, it is detected that a suction port is sealed to the cleaning surface or that a filter is clogged, and thus, the rotational speed of the motor is controlled in accordance with a predetermined operation control rule (hereinafter, simply referred to as a control rule).

The foregoing Japanese official gazette (JP-A-59-146632) discloses that the operating mode can be selected in accordance with the air flow rate. However, various kinds of operating modes are set merely by adjusting an input by phase control and nothing is disclosed with respect to the optimum operation being performed by changing the fundamental characteristic of the electric blower itself. The electric blower consisting of an AC commutator motor which is used in a general vacuum cleaner has a performance characteristic as shown in FIG. 3. In the case of cleaning a bare floor surface by such a motor, when the suction port of the vacuum cleaner is sealed to the bare floor surface, the air flow rate Q decreases and a rotational speed N of the electric blower increases and the sealing force further increases, so that appropriate cleaning cannot be performed. Even if the input of the electric blower is reduced by phase control to change the characteristic as shown by a broken line in FIG. 3, no change occurs in the performance characteristic such that the rotational speed N increases with a decrease in air fow rate amount Q. Consequently, the suction port is sealed on the side of a small air flow rate similarly to the above-mentioned case and the comfortable cleaning cannot be performed.

According to the control system of JP-A-56-34325 mentioned above, control is performed in accordance using a predetermined control rule with a fixed function or gain so as to be proportional or inversely proportional to a change amount (for instance, air flow rate of an operating parameter, pressure, current, etc.) of the cleaner which changes depending on the use of the cleaner. Therefore, when the operating parameter changes, an inconvenience occurs and the contol system attempts to compensate for the inconvenience.

Such an inconvenience will now be described with reference to suction characteristic graphs shown in FIG. 12. In FIG. 12, the abscissa denotes the air flow rate Q and the ordinate indicates the rotational speed N, an electric power W, and a suction static pressure H of the electric blower. For instance, it is now assumed that the control rule is set such that when it is detected through an increase in suction static pressure H, that a curtain or the like is sucked into the suction port and the cleaner appears to be in a closed state, the rotational speed N or electric power W is controlled so as to reduce the suction static pressure H as shown by a broken line in the diagram, thereby preventing the sucking in of the curtain or the like. However, when the suction port is sealed to the carpet floor and a strong suction force is required the electric blower is contolled by the control system to reduce the suction force in a manner similar to the foregoing case, so that the necessary suction force to vacuum the carpet is not derived.

On the other hand, it is desirable to control the suction force and noises by performing such control in accordance with the wishes of a user or various kinds of use conditions such as difference between the physical strengths of persons who use (adult and child) the vacuum or the time of use. However, there is a problem such that it is impossible to perform such a proper control by a single control rule as in the conventional technique.

SUMMARY OF THE INVENTION

It is a main object of the present invention to provide a method of operating a vacuum cleaner in which the suction strength is optimally controlled in accordance with the surface to be cleaned in consideration of the foregoing problems.

Another object of the invention is to provide a vacuum cleaner which can solve the inconvenience caused by the conventional technique of controlling the vacuum system on the basis of a fixed control rule and which can control the operation by an appropriate control rule depending on the use conditions, favor of a user, or the like.

The main object is accomplished by a vacuum cleaner having an electric blower and a speed control unit to operate the electric blower at a variable speed, wherein a plurality of operation control rules are previously stored in the speed control unit, a load current value of the electric blower is continuously detected during the cleaning, the surface to be cleaned is estimated from the load current value, the appropriate operation control rule suitable for the estimated cleaning surface is selected from the operation control rules which have previously been stored in the speed control unit, and the electric blower is driven on the basis of the selected operation control rule.

According to the above operating method, a range of fluctuation the load current of the electric blower of the vacuum cleaner changes depending on for example, the cleaning surface and degree of clogging of the filter, so that the cleaning surface or the clogging state can be detected from the fluctuating range of the load current.

Therefore, operating the electric blower by in accordance with an appropriate operation control rule as to give the electric blower an operating characteristic suitable for the condition of the cleaning surface or the clogging state detected, optimum control can be obtained for cleaning various kinds of different surfaces.

Further, the other object of the invention mentioned above is accomplished by a vacuum cleaner having an electric blower to collect dust in a dust collecting chamber through a suction port by way of negative suction pressure and blower control means for controlling a rotational speed of the electric blower, wherein the vacuum cleaner comprises: a plurality of control rule generating means for generating control rules to specify the correlations of various operating parameters of the cleaner; switching means for selecting one of the control rule generating means; and signal processing means for outputting a control signal to the blower control means so as to make the detected operating parameter of the cleaner coincide with the objective value on the basis of the control rule selected by the switching means.

With the above construction, the contol rule generating means of the control rule associated with the use of the vacuum is selected by the switching means. Thus, the operational parameters (air flow rate, pressure, current, rotational speed, and the like) of the cleaner are automatically adjusted in accordance with the control rule and accordingly the suction performance or noise control according to the particular use of the vacuum or desire of the user can be realized. When the use condition of the vacuum is changed, for instance, from a carpet floor to a curtain or the like, the cleaner can easily cope with such a change by switching the conrol rule generating means. The inconvenience of the conventional technique which utilizes a single control rule is thus solved.

BRIEF DESCRIPTION OF THE DRAWINGS

FIG. 2 is a block diagram showing mainly a control section of an electric blower;

FIGS. 4A and 4B are change state diagrams of a load current of the electric blower depending on the state of the surface to be cleaned;

DESCRIPTION OF THE PREFERRED EMBODIMENTS

An embodiment of the present invention will be described hereinbelow with reference to FIGS. 1 to 9.

In a general vacuum cleaner, an AC commutator motor has conventionally been used as a motor of an electric blower. In recent years, a variable speed control system using a phase control unit is frequently used in order to realize a high rotational speed and to adjust the suction power in accordance with the kind of surface (boarding, tatami, carpet etc.) to be cleaned. As another means for performing varible speed control, there has been known a system consisting of a combination of an inverter control unit and a brushless DC motor, an induction motor, a reactance motor, or a hysteresis motor. The present embodiment which will be explained hereinafter uses the variable speed control system in which the inverter control unit and brushless DC motor are combined.

Figure 1:
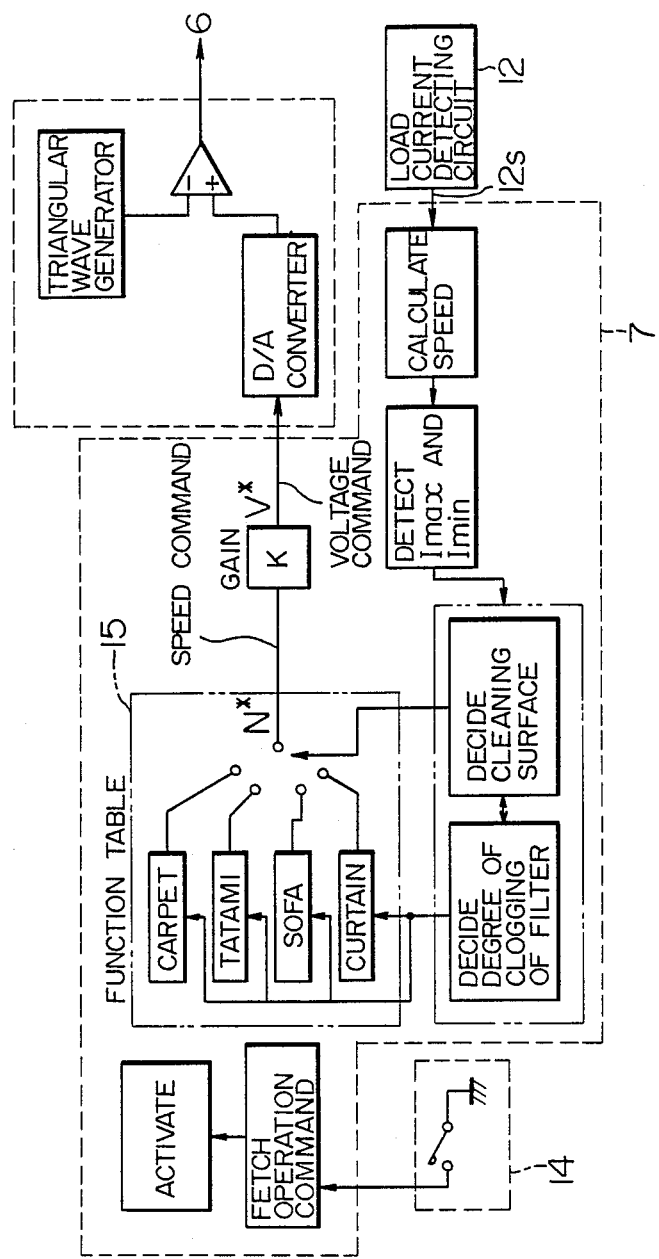
FIG. 1 is a control block diagram of a vacuum cleaner drive apparatus showing an embodiment of the present invention.

FIG. 1 is a block diagram showing s schematic arrangement of the control unit. FIG. 2 shows a control circuit.

In FIG. 2, reference numeral 1 denotes an inverter control unit and 2 indicates an AC power source. The AC power source 2 is rectified by a rectifier 3 and smoothed by a capacitor 4 and a DC voltage $E_d$ is supplied to an inverter 5. The inverter 5 is a 120° current supplying type inverter comprising transistors $TR_1$ to $TR_6$ and fly wheel diodes $D_1$ to $D_6$ connected to the transistors. The current supplying period of time (electrical angle of 120°) of the transistors $TR_1$ to $TR_3$ on the positive potential side of the DC voltage $E_d$ is pulse width modulated and the chopper operation is executed, thereby contolling the AC output voltage. A resistor $R_1$ is connected between a common emitter terminal of the transistors $TR_4$ to $TR_6$ and a common anode terminal of the flywheel diodes $D_4$ to $D_6$.

A brushless DC motor 6 has a rotor R consisting of permanent magnets of two polarities and armature windings U, V, and W. A load current $I_d$ flowing through the windings U, V, and W can be detected as a voltage drop of the resistor $R_1$.

A control circuit to control the rotational speed of the motor 6 comprises: a microcomputer 7; a magnetic pole position detecting circuit 11 to dectect the magnetic pole position of the rotor R by recieving an output from a hall device 8; a current detecting circuit 12 to detect the value of the load current $I_d$ from the voltage drop of the resistor $R_1$; a base driver 13 to drive the transistors $TR_1$ to $Tr_6$; and a start switch 14 which is operated by an actual user.

The current detecting circuit 12 receives the voltage drop of the resistor $R_1$ and detects the load current $I_d$ and forms a current detection signal 12S by an A/D converter or the like.

The microcomputer 7 includes a CPU 7-1, a ROM 7-2, and a RAM 7-3. Although not shown, the CPU, ROM, and RAM are mutually connected by an address bus, a data bus, a control bus, and the like. Programs necessary to drive the brushless DC motor 6, for instance, a fetching process of an arithmetic operation processing speed command of a speed, a speed control process, and the like are stored in the ROM 7-2. The ROM 7-2 has a function table 15 in which a plurality of operation control rules are stored.

On the other hand, the RAM 7-3 is used to read and write various kinds of external data necessary to execute various programs stored in the ROM 7-2.

The transistors $TR_1$ to $TR_6$ are respectively driven by the base driver 13 in accordance with a firing signal 7S which was processed and produced by the microcomputer 7. A voltage command circuit 16 produces a chopper signal.

In the brushless DC motor 6, a winding current flowing through a stator winding corresponds to an output torque of the motor 6. Therefore, by changing an applied current, the output torque can be varied. That is, by adjusting the applied current, the output torque of the motor 6 can be continuously changed. On the other hand, the rotational speed can be freely changed by changing a driving frequency of an inverter.

Figure 3:
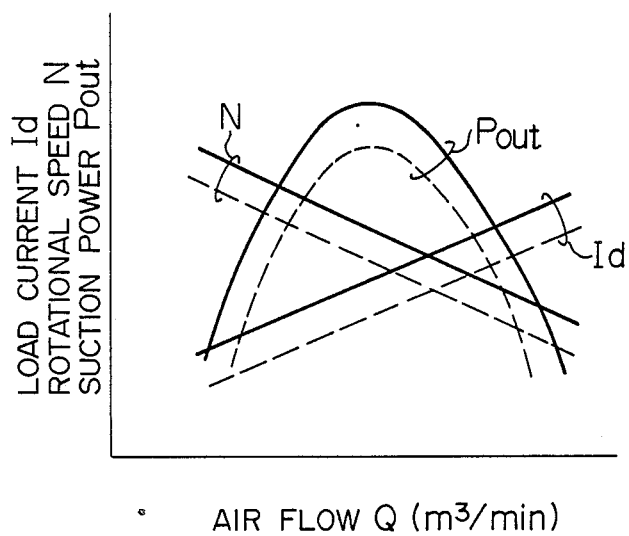
FIG. 3 is a performance curve diagram of the electric blower.

FIG. 3 shows characteristic curves of a vacuum cleaner using an electric blower having a general operating characteristic. In FIG. 3, an axis of abscissa denotes an air flow rate Q ($m^3$/min) and an axis of ordinate represents a suction power $P_{out}$ indicative of the suction performance, the rotational speed N of the electric blower, and the load current $I_d$ thereof.

For instance, when a bare floor surface is cleaned, the degree of sealing of the suction port rises and the air flow rate Q decreases. When the suction port is away from the floor surface, the air flow rate Q increases. Since the suction port is repetitively sealed to and removed from floor during the actual cleaning, the increase and decrease in the load current $I_d$ and rotational speed N are repeated. FIGS. 4(a) and 4(b) show fluctuating states of the load current $I_d$ during cleaning. FIG. 4(a) shows the fluctuating state of the load current Id on the bare floor surface. FIG. 4(b) shows the fluctuating state of the load current $I_d$ on carpet. As will be obvious from the diagrams, in the fluctuating range of the load current $I_d$, the maximum value $I_{11}$ on the bare floor surface and the maximum value $I_{13}$ on the carpet have almost the same values. The minimum value $I_{12}$ on the bare floor surface is smaller than the minimum value $I_{14}$ on the carpet. Therefore, the fluctuating range of the load current $I_d$ on the carpet is smaller than that on the bare floor surface. This is because air leaks through the carpet pile, so that the suction port is not so strongly sealed to the carpet as compared with the bare floor surface as such, a reduction in air flow rate on the carpet is small, a decrease in load current $I_d$ is small, and the fluctuating range of the load current $I_d$ is small.

As mentioned above, the fluctuation range of the load current of the electric blower in the vacuum cleaner varies depending on the surface to be cleaned or the like. Therefor, for instance, by storing the maximum and minimum values ($I_{11}$ and $I_{13}$; $I_{12}$ and $I_{14}$; and the like) of the load current $I_d$ into the ROM 7-2 or RAM 7-3 and by comparing the fluctuation ranges of the load current Id when the electric blower ia actually operated, the cleaning surface can be estimated. In a manner similar to the above, the cleaning surface can be also estimated by detecting the rotational speed of the electric blower. However, since a change in the rotational speed is delayed due to inertia, there is a problem in that it is impossible to cope with an instantaneous change in cleaning surfaces during cleaning.

Figure 5:
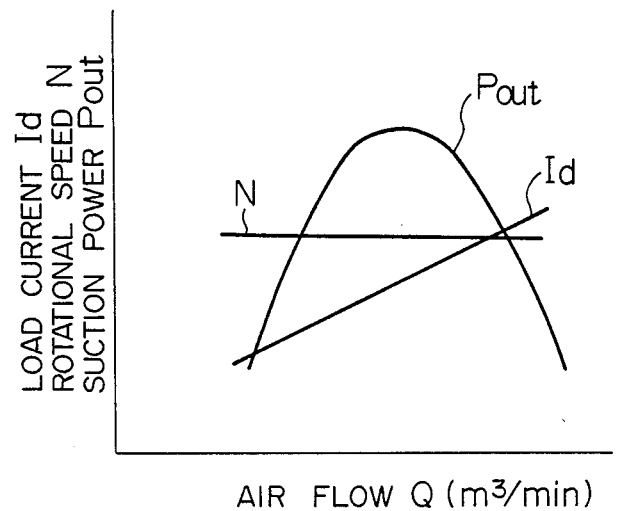
FIGS. 5 to 9 are performance curve diagrams of the electric blower due to the difference of operation control rule.

When detecting the cleaning surface, if the characteristic of the electric blower is set to a characteristic as shown in FIG. 5, the cleaning surface can be more accurately estimated because the ratio of the change in load current to the change in torque of the electric blower is larger than that of the characteristic shown in FIG. 3, for example.

If the characteristic of the electric blower according to the state of the cleaning surface is set to the characteristic as shown in FIG. 3, when the suction port is sealed to the bare floor surface and the air flow rate Q decreases, the rotational speed N of the electric blower increases and the sealing force further increases, so that operating efficiency deteriorates. In the case of cleaning a curtain or the like, the operating efficiency further deteriorates.

Figure 6:
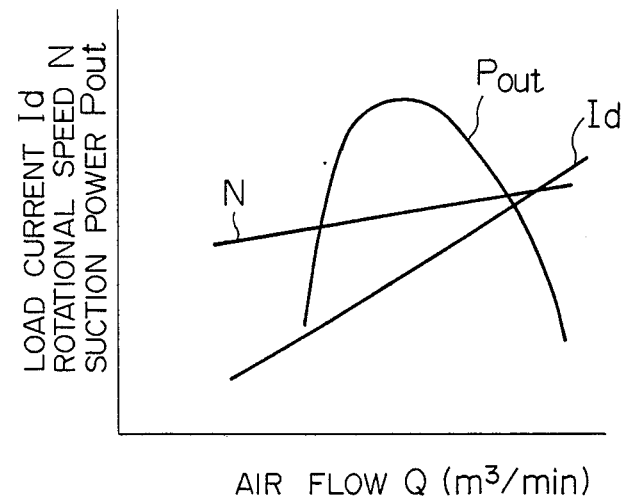

Therefore, in the case of the floor plate surface, if the electric blower has the performance characteristic as shown in FIG. 5, which is known as a shunt-wound characteristic even if the suction port is sealed to the surface, the rotational speed N is constant, so that the sealing force does not increase and the operating efficiency does not deteriorate. In the case of the curtain, if the electric blower has a characteristic as shown in FIG. 6 which is opposite to the characteristic shown in FIG. 3, the curtain is not sealed to the suction port even during the cleaning of the curtain and thus comfortable cleaning can be executed.

However, in the case of a carpet, particularly, a carpet having long carpet pile, since the air leaks through the carpet pile, the suction port is not sealed to the carpet. Thus, the cleaner can be operated at the maximum power.

Figure 7:
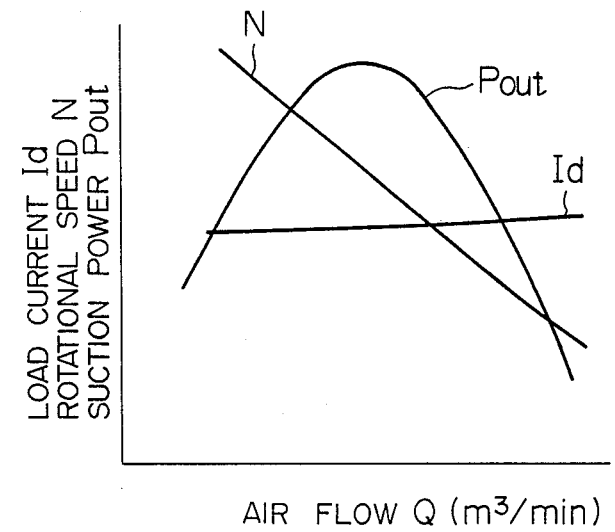
Figure 8:
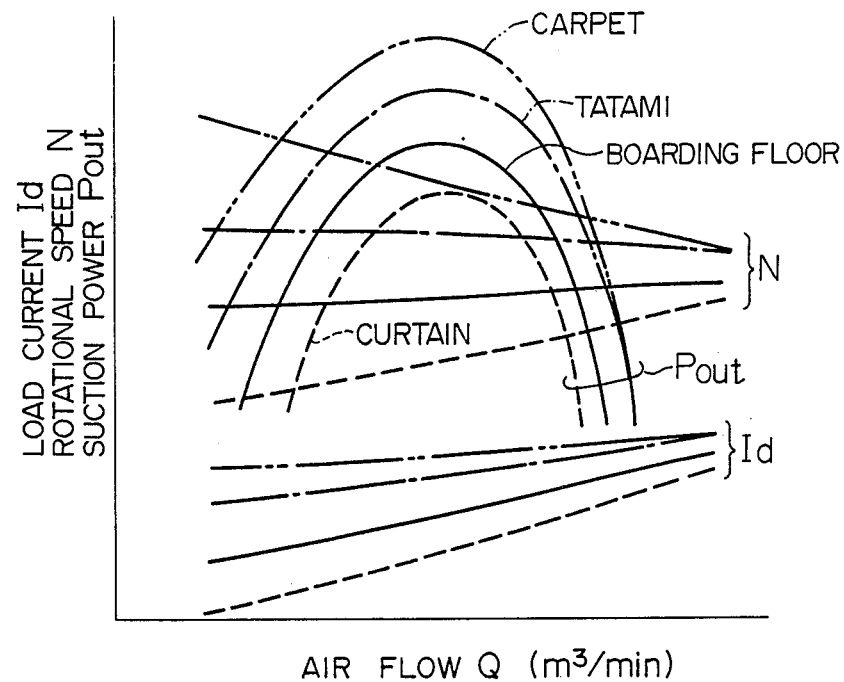

As shown in FIG. 7, if the characteristic of the electric blower is set in a manner such that even if the air flow rate Q decreases, the fluctuating range of the load current $I_d$ is small and an increase amount of the rotational speed N is set to be larger than that of the characteristic of FIG. 3, that is, if it is set to a characteristic so as to provide more power than that of the electric blower having an ordinary performance characteristic, a desired cleaning performance can be obtained. FIG. 8 shows characteristics of the electric blower which are suitable for four typical cleaning surfaces such as a bare floor, tatami (Japanese mat), carpet, and curtain, respectively.

Figure 9:
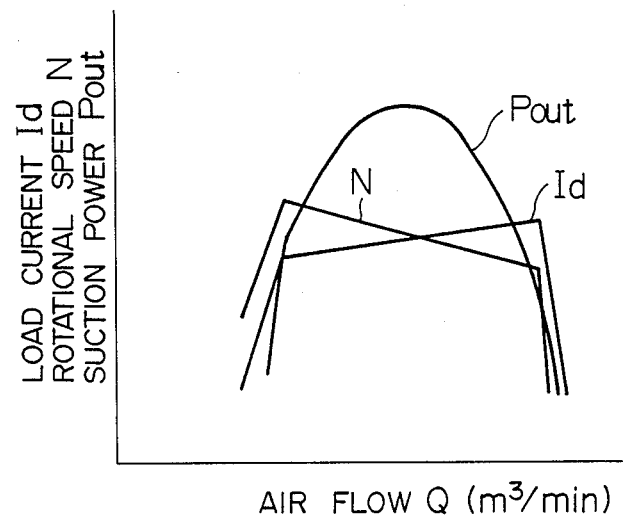

FIG. 9 shows a characteristic in which the cleaner can be operated in a power saving mode. When the wind amount is large, that is, when the suction port is away from the cleaning surface and is open, or on the contrary, when the suction port is sealed to the cleaning surface or when a curtain, a paper, or the like is stuck to the suction port, or the like, thereby creating a state in which no dust is actually absorbed, the input is reduced to thereby prevent consumption of electric power in a power saving mode. The characteristic can also be changed depending on a condition such as a type of user (adult, child), time of use (day, night), or the like.

In order to obtain the electric blower characteristics according to the various kinds of cleaning surfaces and the cleaning conditions mentioned above, the foregoing various kinds of operation control rules of the electric blower are first stored into the ROM 7-2 of the microcomputer 7, the optimum operation control rule is automatically selected from the operation control rules on the basis of the result of the estimation of the cleaning surface by the detection of the load current, and the electric blower is operated and controlled by the selected operation control rule. Thus, the user can easily perform cleaning.

As a method of selecting the optimum operation control rule by automatically detecting the type of floor surface or cleaning state, the more accurate detection and discrimination can be performed by a method whereby the characteristic of the electric blower is switched to the performance characteristic at of FIG. 5 predetermined periods, the ratio of the current change to the load change is set to a large value, detection and discrimination are executed, the optimum operation control rule is selected, the operation control rule is executed, and the above procedure is sequentially repeated.

On the other hand, the user can also manually switch and select a desired operation control rule of the electric blower on the basis of a desired characteristic.

According to the embodiment, the following advantages can be expected.

(1) The load current of the electric blower is continuously detected during cleaning, a cleaning surface or a cleaning object is estimated based on a change in load current over a predetermined time, the operation control rule most suitable for the estimated condition is selected, and the blower can be operated and controlled on the basis of the selected operation control rule.

(2) By setting the characteristic performance of the electric blower to the performance characteristic shown in FIG. 5 when detecting the load current of the electric blower, a change ratio of the load current due to a change in cleaning condition increases. Therefore, the type of cleaning surface can be further accurately estimated. In addition, various kinds of cleaning surfaces can be distinguished.

(3) The period of time to detect the current change mode is set to a short time by switching the characteristic of the electric blower to the performance characteristic of FIG. 5 and the detection is repeated at predetermined periods. Thus, the cleaning perfromance can be detected quickly without obstructing the operation by the optimum operation control rule to be inherently controlled. Further, the operation control rule to be selected is updated while checking the change in cleaning performance at each perdetermined period. Therefore, optimum operating performance can always be accomplished.

(4) The electric blower which is operated and controlled by the operation control rule selected based on the cleaning surface estimated is operated and controlled not only by conventional phase control but also by the performance characteristic of the electric blower itself, for instance, the performance characteristics such as those illustrated in FIGS. 3 and 5 which are appropriate for a given cleaning surface. The optimum operating condition can thus be realized.

Another embodiment of the invention will now be described with reference to FIGS. 10 to 20.

Figure 11:
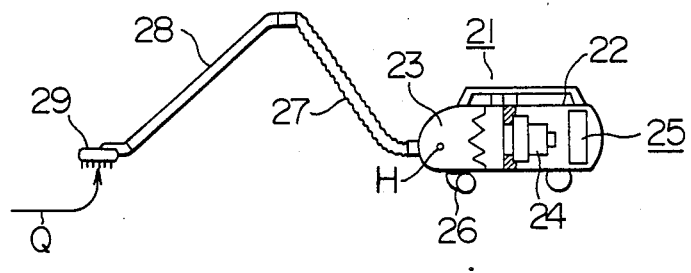
FIG. 11 is a whole arrangement diagram of the embodiment of FIG. 10.

As shown in FIG. 11, a cleaner main body 21 consists of a main body casing 22 and a dust collector casing 23. An electric blower 24 and a control unit 25 are assembled in the casing 22. The dust collector casing 23 is partitioned by a dust filter 26. The dust collector casing 23 is communicated with a suction port 29 through a hose 27 and an extension pipe 28.

Figure 10:
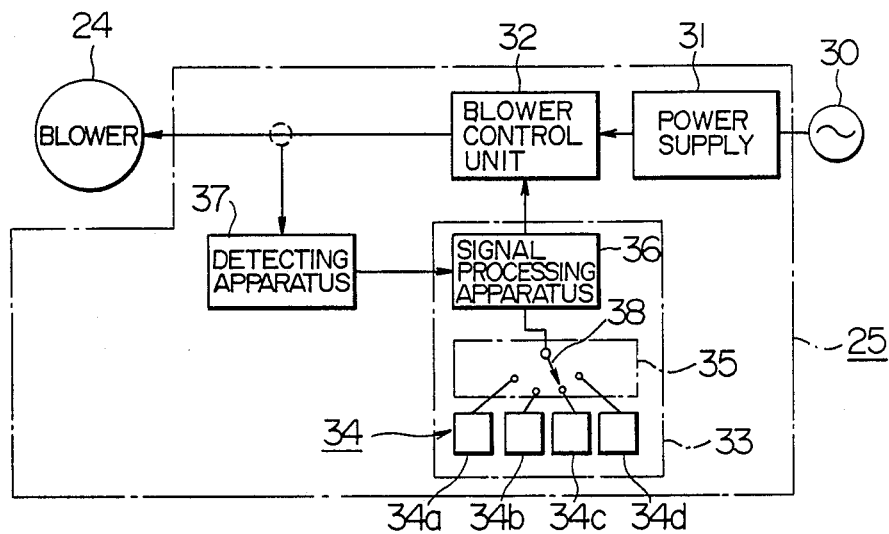
FIG. 10 is a block arrangement diagram of a main section in an embodiment of the present invention.

The control unit 25 is constructed as shown in FIG. 10. An AC voltage which is supplied from an AC power source 30 is converted into a voltage for each of the apparatuses in the cleaner by a power supply apparatus 31. An electric power is supplied from the power supply apparatus 31 to the electric blower 24 through a blower control unit 32. The blower control unit 32 controls a current, a rotational speed, a voltage, etc. of the electric blower 24 on the basis of control amount signals which are output from a command generating apparatus 33. The command generating apparatus 33 comprises: a plurality of memories 34 (34a, 34b, 34c, 34d) serving as control rule generating means in which control rules (objective value functions and the like) are stored; a switching apparatus 35 to select one of the memories 34; and a signal processing apparatus 36 for performing a predetermined signal process on the basis of the objective value function or the like which is given from the selected memory 34 and for outputting a control signal for the electric blower 24. An operating parameter signal of the cleaner which was detected by a detecting apparatus 37 is input to the signal processing apparatus 36. The detecting apparatus 37 detects various kinds of parameters such as voltage, current, and rotational speed which vary depending on the operating condition of the electric blower 24, or pressure, air flow rate, and the like in the respective sections of the vacuum cleaner main body. Then, the detecting apparatus 37 inputs the detected parameter value to the signal processing apparatus 36.

The control rules such as objective value functions and the like in which the correlation among various kinds of operating parameters of the cleaner shown in FIGS. 3 to 6 are set are stored in the mermories 34a to 34d, respectively. The signal processing apparatus 36 outputs a control amount command value to the blower control unit 32 so as to make the detection state amounts which are input from the detecting apparatus 37 coincide with the objective values which are determined in accordance with the control rule.

Each of the memories 34 can be constructed by an analog electric circuit to generate the signal of the objective value function or the like according to the control rule or can be also realized by what is called a digital memory consisting of a semiconductor integrated circuit to store a program software or data values by combining with a microcomputer. The signal processing apparatus 36 in the embodiment can be constructed with a microcomputer.

Figure 12:
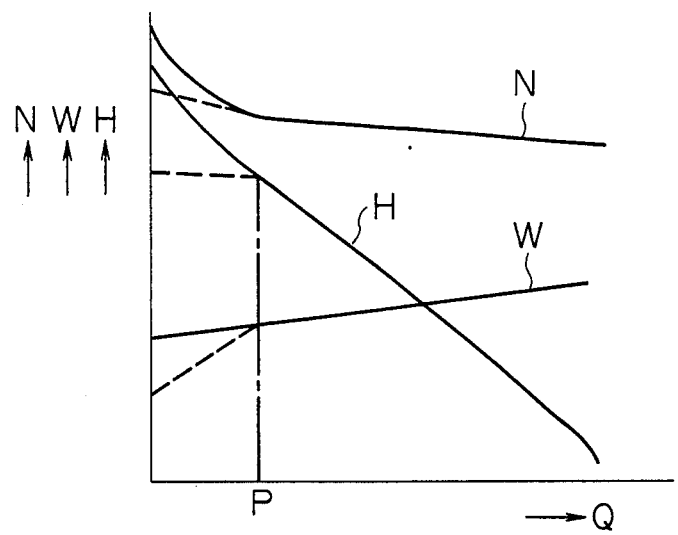
FIGS. 12 to 15 are diagrams showing objective value functions according to the control rules in the embodiment shown in FIG. 10.

The operation of the embodiment with the foregoing construction will now be described. The case where a control rule shown in FIG. 12 is selected by the switching apparatus 35 will now be described as an example. FIG. 12 shows a control rule suitable for the case where there are many cleaning surfaces which are likely to be sealed to the suction port 29, such as in the case of a curtain, a newspaper, or the like. As shown in the diagram, when the air flow rate Q in the suction port section decreases by a great amount the sealing of the cleaner is set to a state near the closed state, the electric power W is reduced as shown by a broken line in the diagram, thereby reducing the suction static pressure H to prevent the sealing off.

In other words, as shown in FIG. 12, when the air flow rate Q enters the operating range of point P or less, the degree of sealing of the suction port is detected and the electric power W is decreased as indicated by the broken line shown in the diagram, thereby reducing the suction static pressure H.

The air flow rate Q is detected by the following method. In consideration of the fact that the air flow rate Q correlates to the current of the electric blower 24 and the current is proportional to the electric power W, the flow rate Q can be detected by the current value, since the electric power W decreases with a reduction of the air flow rate Q as indicated by the solid line shown in FIG. 3. Therefore, and objective value function regarding the current is previously stored into the memories 34 and compared with the current detection value which is input from the detecting apparatus 37. A voltage command value for the electric blower 24 is determined so as to obtain the characteristic shown by the broken line in FIG. 12 and is output to the blower control unit 32. An example to the signal processing procedure will now be described with reference to FIG. 16. In step 102 in FIG. 16, the current detection value is fetched. The current detection value is compared with upper and lower limit values which have previously been stored in the memory 34 in steps 104 and 108, thereby deciding whether the air flow rate Q has entered the operating range of point P or less in FIG. 12 or not. At the same time, the voltage command value corresponding to the operating range is output to the blower control unit 32 (step 112). If the current detection value is equal to the lower limit value or less, the present lower limit value is set to the upper limit value in step 110, the lower limit value is rewritten to a further lower value which is lower by a predetermined value, and the voltage command value is set to lower value on the basis of the rewritten lower limit value. By repeating the above processes, the electric power W is reduced in accordance with the reduction of the air flow rate Q, the increase in suction static pressure H is suppressed, the sealing force of the suction port is reduced, and thereby enabling dust to be easily removed from a curtain or the like without sticking the curtain to the suction port.

If the seal is released, the flow rate Q increases and the current also increases due to the increase in air flow rate. Therefore, in a manner opposite to the foregoing procedure, the upper limit value is sequentially rewritten in step 106 and the electric power W or the like is increased in accordance with the characteristic shown by the broken line in FIG. 12.

The solid line shown in the characteristic diagram of FIG. 12 or the like denotes the characteristic in the case where a commutator motor is used as the electric blower 24 and operated at a predetermined voltage.

Figure 16:
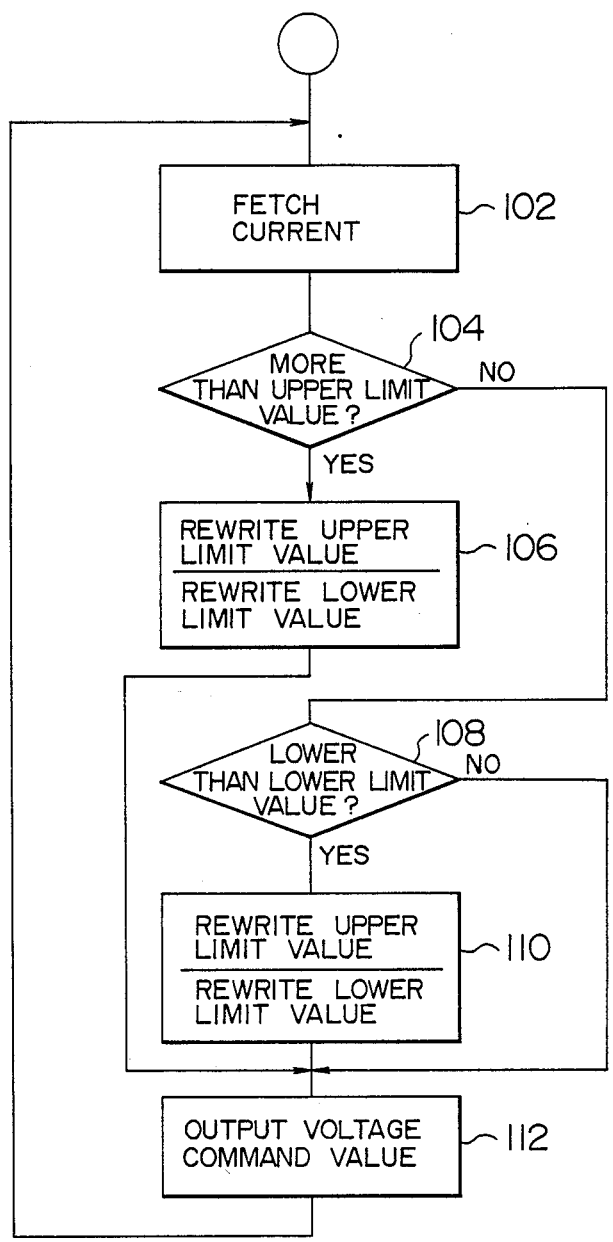
FIG. 16 is a flowchart showing a processing procedure of a signal processing apparatus in the embodiment of FIG. 10.

According to the processing procedure of FIG. 16, a step-like control method consisting of a plurality of intervals is executed for the range from point P to the point at which the air flow rate Q is 0. The smooth operating characteristic can be obtained as a whole as shown by the broken lines.

The detected parameter in step 102 of FIG. 16 is not limited to the current. The air flow rate Q or suction static pressure H can be detected by using a flow rate sensor or a pressure sensor and the control can be performed on the basis of the detected air flow rate or suction static pressure.

The controlled value is not limited to the voltage. The rotational speed can be also directly controlled by using an inverter or the like.

Figure 13:
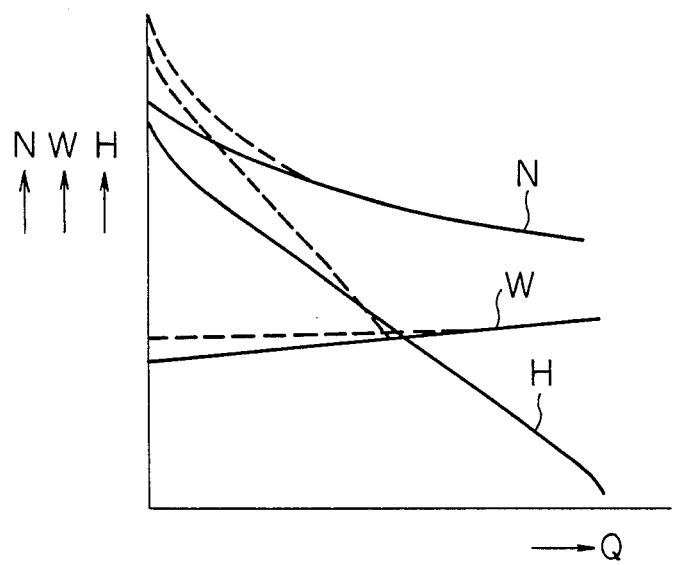

A control rule shown in FIG. 13 is suitable in the case where there are many cleaning surfaces which require a strong suction force, such as in the case of a carpet or the like. In FIG. 13, solid lines indicate the relations of operating parameters in ordinary use of the cleaner. When the suction port is in contact with the cleaning surface and the flow rate Q is set on the closed side, such a state is detected and the electric power W to be consumed is increased as indicated by the broken line shown in the diagram, thereby obtaining the strong suction force (suction static pressure H).

Figure 14:
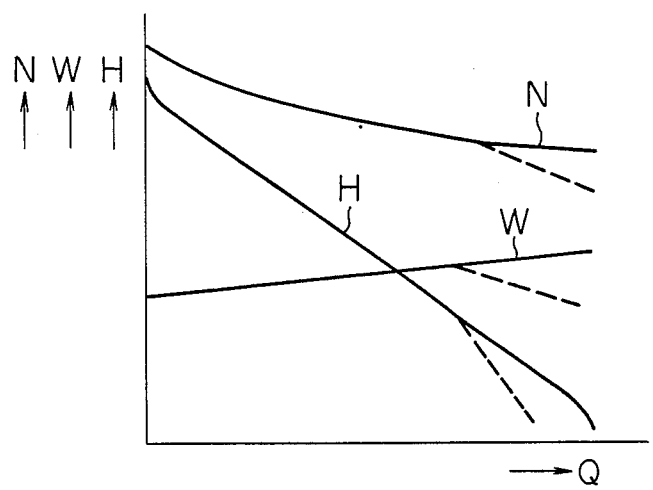

A control rule shown in FIG. 14 is suitable for the case where the vacuum cleaner is used in a state in which the suction port 29 is lifted up in the air, that is, for example, in the case where a rest is being taken and cleaning is not actually being performed. Since the air flow rate is generally large in such a use state, the electric power W is reduced as shown by the broken line in the diagram within a range which exceeds a predetermined air flow rate, thereby obtaining advantages such as a savings of electric power, reduction in noises, and the like.

Figure 15:
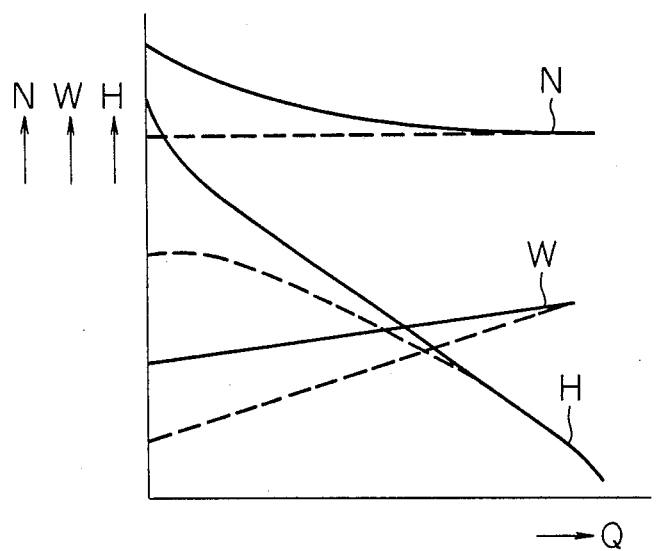

In a control rule shown in FIG. 15, even if the air flow rate Q changes, the rotational speed N is held constant as shown by a broken line in the diagram. In a manner similar to the case of FIG. 12, the control rule of FIG. 15 is suitable to prevent the absorption to the suction port by gradually reducing the consumption of electric power W in accordance with a decrease in air flow rate in the case where the suction port is likely sealed to the cleaning surface.

From the viewpoint of the control of the electric blower, the control rule of FIG. 15 intends to control the rotational speed constant. Therefore, such control can also be obtained without performing any special control if using a system where the frequency is controlled so as to be constant by using an inverter drive motor as a drive motor of the electric blower. That is, the above embodiment of the invention has been described based on the performance characteristic of an AC commutator motor which has conventionally been used. However, the invention can be also applied to an electric blower having a motor of another drive system. In particular, since many of the inverter drive motors and brushless motors function to control the rotational speed or input/output, the foregoing embodiment of the invention can be realized by merely adding a simple apparatus.

As described above, a plurality of different control rules suitable for different use conditions are provided and can be switched and selected. Therefore, control can be realized without any inconvenience. In other words, a variety of functions having various kinds of operating characteristics can be realized by a single vacuum cleaner.

Figure 17:
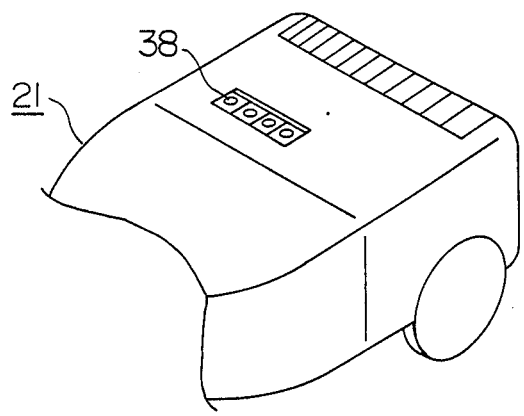
FIG. 17 is an external view of a switching apparatus in the embodiment of FIG. 10.

FIG. 17 is an external perspective view of the cleaner main body 21 showing a practical example of the switching apparatus 35 in the other embodiment of FIG. 10. The switching apparatus 35 consists of a plurality of change-over switches 38 connected electrically to the memories 34a to 34d, respectively. A desired control rule can be selected by selecting and switching the change-over switches 38.

Figure 18:
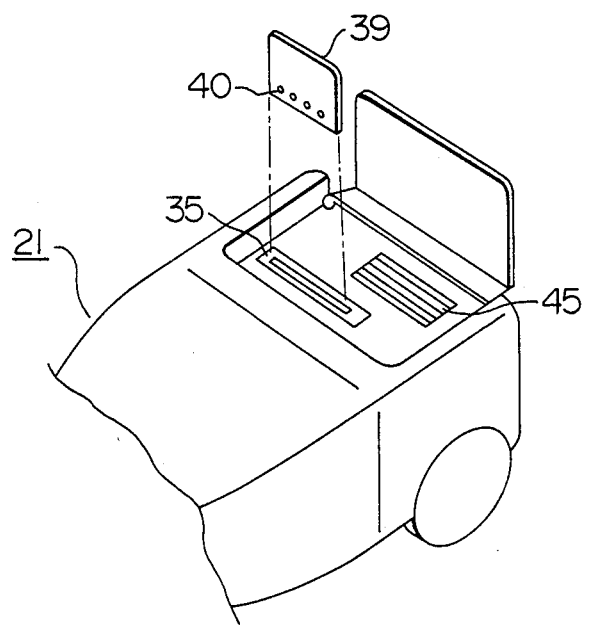
FIG. 18 is an external view showing a modification of a switching apparatus.

FIG. 18 shows still another embodiment of the switching apparatus 35. When the mechanical change-over switches 38 are used as in the example shown in FIG. 17, if the number of signal lines is large, the assembling and wiring works become complicated. According to the switching apparatus of FIG. 18, ID (identification) codes corresponding to the memories 34a to 34d are expressed by binary codes of a few bits. A card 39 in which holes 40 are formed at the positions of the bits corresponding to the binary codes is formed. The card 39 is exchanged and inserted into the switching apparatus 35. The ID codes of the card 39 are read by optical fiber cables or photocouplers (not shown). The electrical connections between the memories 34a to 34d and the signal processing apparatus 36 are switched on the basis of the read ID codes. The switching circuit can be constructed by an integrated circuit or the like. The other cards 39 are held in an enclosing pocket 45 provided separately.

Figure 19:
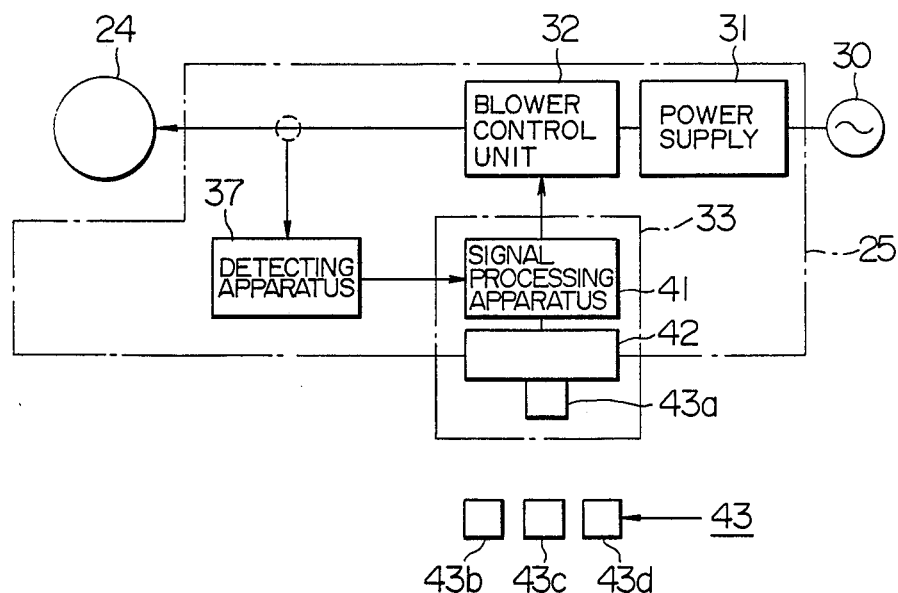
FIG. 19 is a block arrangement diagram of a use section in another embodiment of the invention.

FIG. 19 shows a block arrangement of the main section in further another embodiment. In FIG. 19, the parts and components having the same functions as those in the embodiment shown in FIG. 10 are designated by the same reference numerals and their descriptions are omitted. A signal processing apparatus 41 consists of an electric circuit including a microcomputer. The command value generating program and data used as a control rule generating means are stored in an external memory 43. The external memory 43 is detachably connected to the signal processing apparatus 41 through an inserting port 42. The external memory 43 (43a to 43d) can be made of cards or memory cassettes having therein integrated circuits or the like. Each external memory 43 is provided in correspondence to each control rule. A desired control rule can be selected by exchanging the external memories 43.

Figure 20:
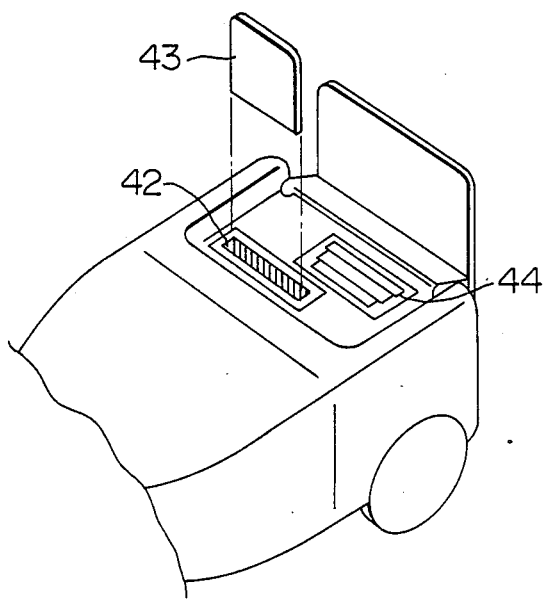
FIG. 20 is an external view of a main section in the embodiment of FIG. 19.

FIG. 20 is a perspective view showing an external view of the main section in still another embodiment. The inserting port 42 is formed on the upper external surface of the cleaner main body 21. The control rule can be switched by taking out a desired external memory 43 from an enclosing pocket 44 and setting into the inserting port 42.

According to still another embodiment, in addition to the advantages of the embodiment of FIG. 10, the memory capacity of the data or the like according to the control rules can be increased. Therefore, the suction performance of more complicated control rules can be realized and various kinds of control rules can be realized.

A combination system of the embodiments of FIGS. 10 and 19 can be also considered as still another embodiment. For instance, by using a system in which various kinds of many control rules are stored in one external memory 43 and a desired control rule is selected from among the control rules by using a changeover switch corresponding to the switching apparatus 35, the number of exchanging times of the external memory 43 can be reduced and a more advanced selection of control rules can be provided. The electric power is automatically switched, thereby enabling the operation noise level at night to be automatically reduced.

In any of the foregoing embodiments, the cleaner can also be operated by the conventional known ordinary suction characteristic.

According to the embodiment of FIG. 19, a rewritable type memory can also be used as the external memory 43.

As described above, according to the invention, there is obtained an operating method of the vacuum cleaner in which the load current value of the electric blower is continuously detected during cleaning, the cleaning surface or a cleaning object is estimated from the load current value, the optimum operation control rule is selected from among a plurality of operation control rules stored in the cleaner and the cleaner is operated in accordance with the optimum operation control rule.

On the other hand, by performing the switching with a microcomputer, the number of parts can be reduced and the circuit can be simplified.

According to still another embodiment in which the control rules are stored into a memory or an external memory, an extremely large number of kinds of control rules can be realized as compared with the control rule generating means being an electric circuit. Moreover, more complicated control rules (having fine differences or the like) can be also realized and can properly cope with the wishes of the user.

As still another modification, a timer function is provided in the external memory 43 or signal processing apparatuses 36 and 41, the day and night are discriminated by the timer function and the value of a reference unit, and the electric blower is operated and controlled on the basis of a selected control rule, thereby enabling optimum operation of the cleaning which is in accordance with the user's wishes.

On the other hand, according to the invention, a plurality of control rules to control the suction performance according to a use condition or desire of the user are provided and an appropriate control rule can be selected by switching. Therefore, a control rule having an optimum characteristic can be selected and used in accordance with the particular use condition and desire of the user. Thus, a cleaner having various kinds of operating characteristics can be easily realized. Proper cleaning according to the use condition and wish of the user can be performed.

Further, by switching and using a different control rule, a optimum characteristic according to a special use condition can be realized without being restricted by other operating conditions of the cleaner.

We claim:

1. A method of operating a vacuum cleaner having at least an electric blower and a speed control unit for controlling the operating speed of said electric blower, said speed control unit having stored therein a plurality of operation control rules for controlling said electric blower, said method comprising the steps of:
   detecting continuously a value of a load current of said electric blower during a cleaning operation;
   determining a type of surface being cleaned in response to said detected load current;
   selecting one of said plurality of operation control rules based upon the determination of the type of surface being cleaned; and
   controlling said electric blower in accordance with said selected one of said plurality of operation control rules.

2. A method according to claim 1, wherein said plurality of operation control rules for said electric blower include at least: a first operation control rule in which a rotational speed of said electric blower is controlled to be constant; a second operation control rule in which said rotational speed of said electric blower increases when an air flow rate decreases; a third operation control rule in which said rotational speed of said electric blower decreases when said air flow rate decreases; and a fourth operation control rule in which an input to said electric blower is reduced during a predetermined period when said vacuum cleaner is not performing a cleaning operation.

3. A method according to claim 1, wherein said plurality of operation control rules stored in said speed control unit include operation control rules for at least four cleaning surfaces, said at least four surfaces including at least a floor plate, a tatami, a carpet, and a curtain.

4. A method according to claim 1, wherein said selected one of said plurality of operation control rules causes said electric blower to be controlled by said speed control unit in accordance with a shunt-wound characteristic.

5. A method according to claim 1, wherein said determining step determines said cleaning surface based on a fluctuation range of said load current value over a predetermined period of time.

6. A method according to claim 1, wherein said selected operation control rule is automatically selected from among said plurality of operation control rules stored in said speed control unit in response to the determination of type of surface being cleaned, and wherein at least one of said plurality of operation control rules stored in said speed control unit can be manually selected.

7. A method according to claim 1, wherein said speed control unit includes a microcomputer and said plurality of operation control rules for said electric blower are stored in said microcomputer.

8. A vacuum cleaner comprising:

an electric blower for collecting dust in a dust chamber through a suction port, said electric blower creating a suction pressure;

blower control means for controlling a rotational speed of said electric blower;

control rule generating means for generating a plurality of control rules for controlling the operation of said vacuum cleaner;

means for selecting one of said plurality of control rules generated by said control rule generating means; and signal processing means for processing said selected one of said plurality of operation control rules and for outputting a control signal to said blower control means so as to control operation of said electric blower in accordance with said selected control rule.

9. A vacuum cleaner according to claim 8, wherein said signal processing means comprises a microcomputer and said control rule generating means comprises a plurality of memories in which data relating to predetermined operating parameters of said vacuum cleaner are stored.

10. A vacuum cleaner according to claim 8, wherein said signal processing means comprises a microcomputer, said control rule generating means includes a plurality of dependent memories for storing data relating to predetermined operating parameters of said vacuum cleaner, and said means for selecting selects one of said plurality of control rules by switching between said plurality of independent memories.

* * * * *